United States Patent
Chiba et al.

[11] Patent Number: 6,043,776
[45] Date of Patent: Mar. 28, 2000

[54] MOBILE SATELLITE COMMUNICATION SYSTEM

[75] Inventors: Isamu Chiba; Takashi Katagi; Shuji Urasaki; Yoshihiko Konishi; Makoto Matsunaga; Akio Iso, all of Tokyo, Japan

[73] Assignee: Mitsubishi Denki Kabushiki Kaisha, Tokyo, Japan

[21] Appl. No.: 09/033,169

[22] Filed: Mar. 2, 1998

[30] Foreign Application Priority Data

Mar. 14, 1997 [JP] Japan ................................. 9-061152

[51] Int. Cl.⁷ .................................................. H04B 7/185
[52] U.S. Cl. .......................... 342/354; 342/352; 455/12.1; 359/172; 359/173
[58] Field of Search ................................ 342/352, 354, 342/357.01, 368, 375, 356; 455/12.1; 359/172, 173; 244/158 R

[56] References Cited

U.S. PATENT DOCUMENTS

| | | |
|---|---|---|
| 4,827,421 | 5/1989 | Dondl . |
| 4,843,397 | 6/1989 | Galati et al. ................................. 342/59 |
| 4,885,589 | 12/1989 | Edward et al. ........................... 342/175 |
| 4,922,257 | 5/1990 | Saito et al. ............................... 342/377 |
| 4,943,808 | 7/1990 | Dulck et al. .............................. 342/356 |
| 5,016,018 | 5/1991 | Chang et al. . |
| 5,161,248 | 11/1992 | Bertiger et al. . |
| 5,231,405 | 7/1993 | Riza .......................................... 342/375 |
| 5,345,321 | 9/1994 | DeJule et al. ............................... 359/42 |
| 5,367,305 | 11/1994 | Völker et al. ............................. 342/368 |
| 5,422,647 | 6/1995 | Hirshfield et al. . |
| 5,430,451 | 7/1995 | Kawanishi et al. . |
| 5,500,648 | 3/1996 | Maine et al. . |
| 5,548,292 | 8/1996 | Hirshfield et al. ....................... 342/354 |
| 5,619,211 | 4/1997 | Horkin et al. ............................ 342/357 |
| 5,652,750 | 7/1997 | Dent et al. ................................ 370/326 |
| 5,758,260 | 5/1998 | Wiedeman .............................. 455/12.1 |
| 5,788,187 | 8/1998 | Castiel et al. ........................ 244/158 R |
| 5,790,070 | 8/1998 | Natarajan et al. ....................... 342/354 |
| 5,845,206 | 12/1998 | Castiel et al. ........................... 455/13.4 |

FOREIGN PATENT DOCUMENTS

| | | |
|---|---|---|
| 0237009A2 | 9/1987 | European Pat. Off. . |
| 0464765A1 | 1/1992 | European Pat. Off. . |
| 2315644A | 2/1998 | United Kingdom . |
| 2318947A | 5/1998 | United Kingdom . |
| WO 9429927 | 12/1994 | WIPO . |
| WO 9522489 | 8/1995 | WIPO . |
| WO 9705704 | 2/1997 | WIPO . |

*Primary Examiner*—Thomas H. Tarcza
*Assistant Examiner*—Dao L. Phan

[57] ABSTRACT

A mobile satellite communication system including an artificial satellite which is situated in a satellite orbit and develops an active phased array antenna so as to accomplish a line to a terrestrial station using a portable terminal in a specific area. As a result, a service that satisfies a demand for communication in the specific area can be realized.

3 Claims, 10 Drawing Sheets

MOBILE SATELLITE COMMUNICATION SYSTEM

BACKGROUND OF THE INVENTION

1. Field of the Invention

The present invention relates to a mobile satellite communication system in which a satellite provided with a large-scaled antenna thereon is put in a static orbit or a substantially static orbit so as to carry out communication by means of a plurality of beams.

2. Description of the Related Art

A conventional mobile satellite communication system will be described with reference to FIG. 10. FIG. 10 is a diagram showing a conventional mobile satellite communication system disclosed, for example, in U.S. Pat. No. 5,500,648.

In FIG. 10, reference symbol E denotes the earth and S is an artificial satellite.

The mobile satellite communication system shown in FIG. 10 is designed to perform communication while several tens of satellites S are made to round in a low-round orbit situated at a longitude several hundreds Km above the ground.

The feature of the mobile satellite communication system resides in that a world-wide communication network is produced through the artificial satellites S so that communication can be made from an arbitrary place to a desired place.

Thus, in the above-mentioned conventional mobile satellite communication system, the world-wide communication network is provided. However, there is such a problem that although communication channels must be ensured in specific areas because a demand for communication is recently rapidly increased, the provision of the world-wide network makes it difficult to flexibly cope with an increase in the demand for communication in the specific areas.

SUMMARY OF THE INVENTION

The present invention has been made in order to solve the above-mentioned problem, and therefore an object of the present invention is to provide a mobile satellite communication system in which a satellite is put in a static orbit or a substantially static orbit so as to cover a service area by means of a large number of beams.

Another object of the present invention is to provide a mobile satellite communication system which is capable of reducing a loss in transmission from an antenna to a processing unit inside of the satellite.

Still another object of the present invention is to provide a mobile satellite communication system which is capable of accommodating the antenna in a compact manner.

In order to achieve the above objects, according to the present invention, there is provided a mobile satellite communication system having an artificial satellite that is disposed in a satellite orbit and develops an active phased array antenna so that it accomplishes a line to a terrestrial station using a portable terminal in a specific area.

Also, according to the present invention, there is provided a mobile satellite communication system in which said active phased array antenna is comprised of a receive active phased array antenna and a transmit active phased array antenna.

Further, according to the present invention, there is provided a mobile satellite communication system in which said artificial satellite is comprised of an receive artificial satellite only for reception on which said receive active phased array antenna is mounted and a transmit artificial satellite only for transmission on which said transmit active phased array antenna is mounted, and in which said receive artificial satellite and said transmit artificial satellite are connected to each other through a communication line.

Still further, according to the present invention, there is provided a mobile satellite communication system in which said receive artificial satellite and said transmit artificial satellite are docked with each other after said receive artificial satellite and said transmit artificial satellite are put in said satellite orbit, to exhibit a transmit/receive function as one artificial satellite.

Still further, according to the present invention, there is provided a mobile satellite communication system in which said active phased array antenna is composed of a receive active phased array antenna having an electric wave-to-optical convertor that converts a signal received by a device antenna into an optical signal, in which a satellite body of said artificial satellite includes an optical-to-electric wave convertor that converts the optical signal into an electric signal, and in which said electric wave-to-optical convertor and said optical-to-electric wave convertor are connected to each other through an optical fiber.

Yet still further, according to the present invention, there is provided a mobile satellite communication system in which said satellite body further includes an analog-to-digital signal convertor that converts said analog electric signal into a digital signal, and a digital beam former that forms a beam on the basis of said digital signal.

Yet still further, according to the present invention, there is provided a mobile satellite communication system in which said satellite body of said artificial satellite includes an electric wave-to-optical convertor that converts the electric signal into the optical signal, in which said active phased array antenna is comprised of a transmit active phased array antenna having an optical-to-electric wave convertor that converts the optical signal into a microwave signal and a device antenna that radiates said microwave signal, and in which said electric wave-to-optical convertor and said optical-to-electric wave convertor are connected to each other through an optical fiber.

Yet still further, according to the present invention, there is provided a mobile satellite communication system in which said satellite body further includes a digital beam former that forms a beam on the basis of a data signal, and a digital-to-analog signal convertor that converts said digital electric signal into an analog signal.

Yet still further, according to the present invention, there is provided a mobile satellite communication system in which said satellite orbit is a static orbit.

Yet still further, according to the present invention, there is provided a mobile satellite communication system in which said satellite orbit is a substantially static orbit inclined with respect to the equator and having an eccentricity.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

A description will be given of preferred embodiments of the present invention with reference to the accompanying drawings.

First Embodiment

Figure 1:
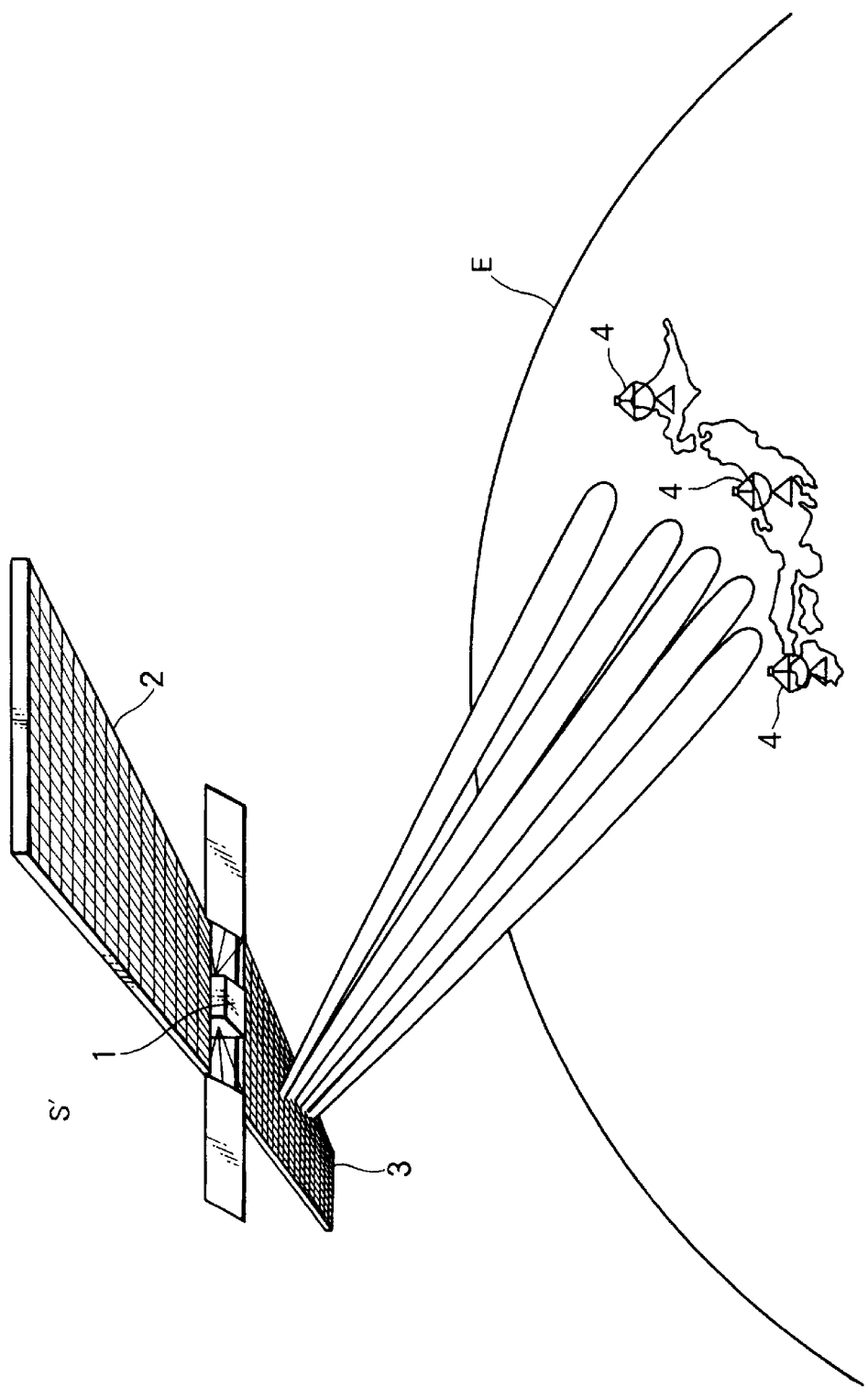
FIG. 1 is a diagram showing a structure of a mobile satellite communication system according to a first embodiment of the present invention.

A mobile satellite communication system according to a first embodiment of the present invention will be described with reference to FIG. 1. FIG. 1 is a diagram showing a structure of the mobile satellite communication system according to the first embodiment of the present invention. In the respective drawings, identical or like parts are designated by the same references.

In FIG. 1, symbol E denotes the earth, and S' is an artificial satellite. Also, reference numeral 1 denotes a satellite body of the artificial satellite S', 2 is a receive phased array antenna, and 3 is a transmit phased array antenna. Further, reference numeral 4 denotes a representative terrestrial station situated in Japan.

The mobile satellite communication system thus organized according to the first embodiment is arranged in such a manner that the artificial satellite S' (space station) is situated in a static orbit, and large-scaled active phased array antennas 2 and 3 are developed to perform communication with the terrestrial station 4 so as to flexibly cope with an increase in the demand for mobile communication in the specific areas, for example, Japan. In this example, a digital voice service in Japan is exemplified for description of this embodiment.

It is assumed that among all population in Japan, fifty million people use portable terminals that conduct the digital voice service. In the case where the services for five million portable terminals which are 1/10 of all the terminals are given by this mobile satellite communication system, one hundred thousand channels must be ensured. In this case, all the area in Japan must be covered by 160 beams.

Also, in order to satisfy the above condition, the size of an antenna must be required with an opening of 45 m square.

In order to use the antenna of that size in the artificial satellite, the phased array antenna type is applied as shown in FIG. 1.

Further, in order to mount the active phased array antenna with the opening of 45 m square on the artificial satellite, there is applied a type in which the antenna is folded to a size that allows the antenna to be accommodated in a rocket, and the antenna is then developed in orbit. The active phased array makes the number and shape of beams variable according to the structure of a feeder system.

As in the first embodiment, in the mobile satellite communication system characterized in that the artificial satellite S' is situated in the static orbit, and the large-scaled active phased array antennas 2 and 3 are developed to conduct communication with the terrestrial station 4, a communication service that satisfies a demand for communication in a specific area can be performed.

In the first embodiment, with a structure in which one or plural artificial satellites S' are situated in the static orbit, and a device antenna for accomplishing a line to the terrestrial station using the portable terminal and the active phased array antennas 2 and 3 having a plurality of active amplifiers are developed, a large number of beams can be disposed on the ground, the terrestrial base station can be complemented, thereby being capable of realizing the communication service that satisfies a demand for communication in a specific area.

Second Embodiment

Figure 2:
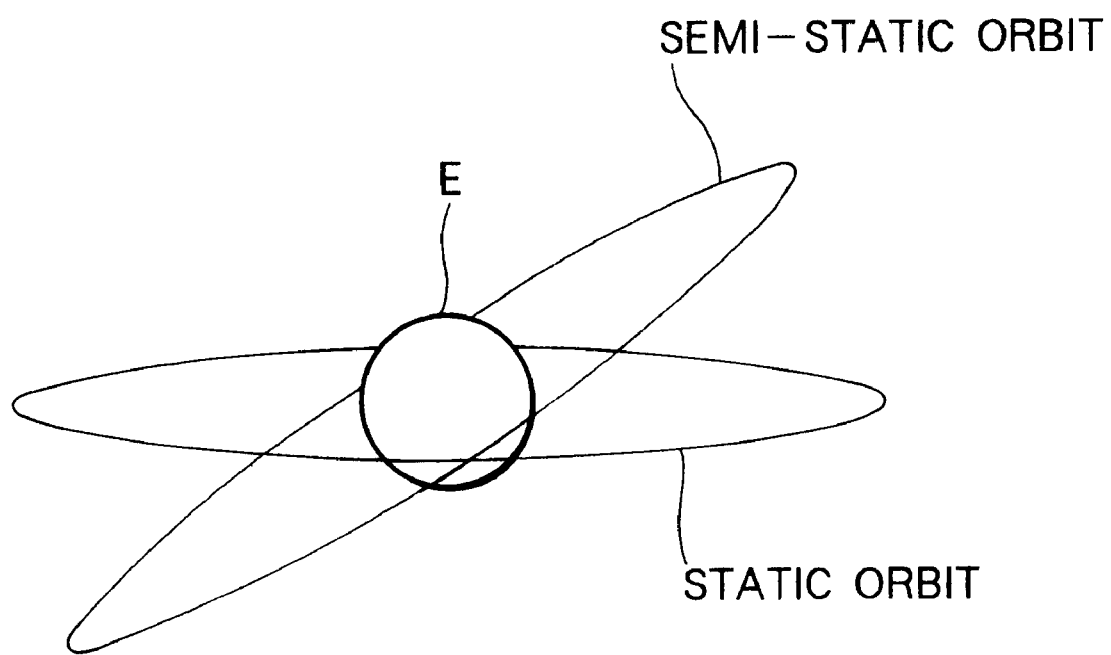
FIG. 2 is a diagram showing an orbit of an artificial satellite in a mobile satellite communication system according to a second embodiment of the present invention.
Figure 3:
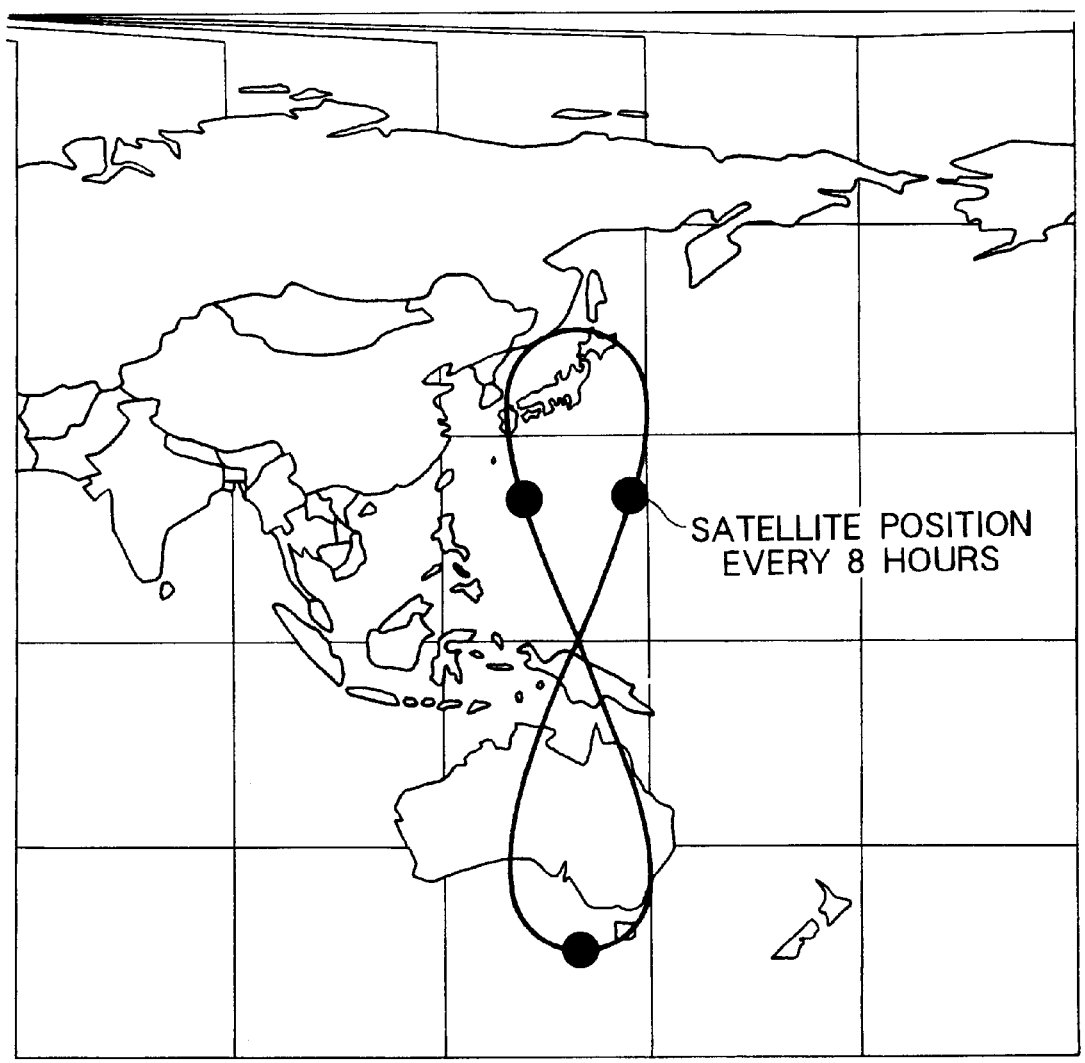
FIG. 3 is a diagram showing an orbit of an artificial satellite in a mobile satellite communication system according to the second embodiment of the present invention.

A mobile satellite communication system according to a second embodiment of the present invention will be described with reference to FIGS. 2 and 3. FIGS. 2 and 3 are diagrams each showing an orbit according to the second embodiment of the present invention. The structure of the artificial satellite is identical with that in the above first embodiment.

In the mobile satellite communication system using the static orbit according to the above first embodiment, there is a drawback that an electric wave from the artificial satellite is liable to be shielded by a shielding substance such as a building because an angle of the artificial satellite viewed from the earth is low.

In the second embodiment, in order to solve the above drawback, a plurality of artificial satellites are situated in an orbit inclined with respect to the static orbit (semi-static orbit), and active phased array antennas are developed.

FIG. 2 shows a relation between an inclination of the semi-static orbit and a satellite depth angle.

FIG. 3 shows an example of the semi-static orbit, and in case of this semi-static orbit, the artificial satellite is viewed from Japan at an angle of 60 degrees or more, thereby being capable of reducing an adverse influence of the shielding substance on the ground.

In the second embodiment, since the orbit of the artificial satellite is inclined with respect to the equator, and the artificial satellite is situated in the orbit having an eccentricity, an elevation angle of the artificial satellite viewed from the ground becomes high, thereby being capable of an adverse influence of the shielding substance.

Third Embodiment

Figure 4:
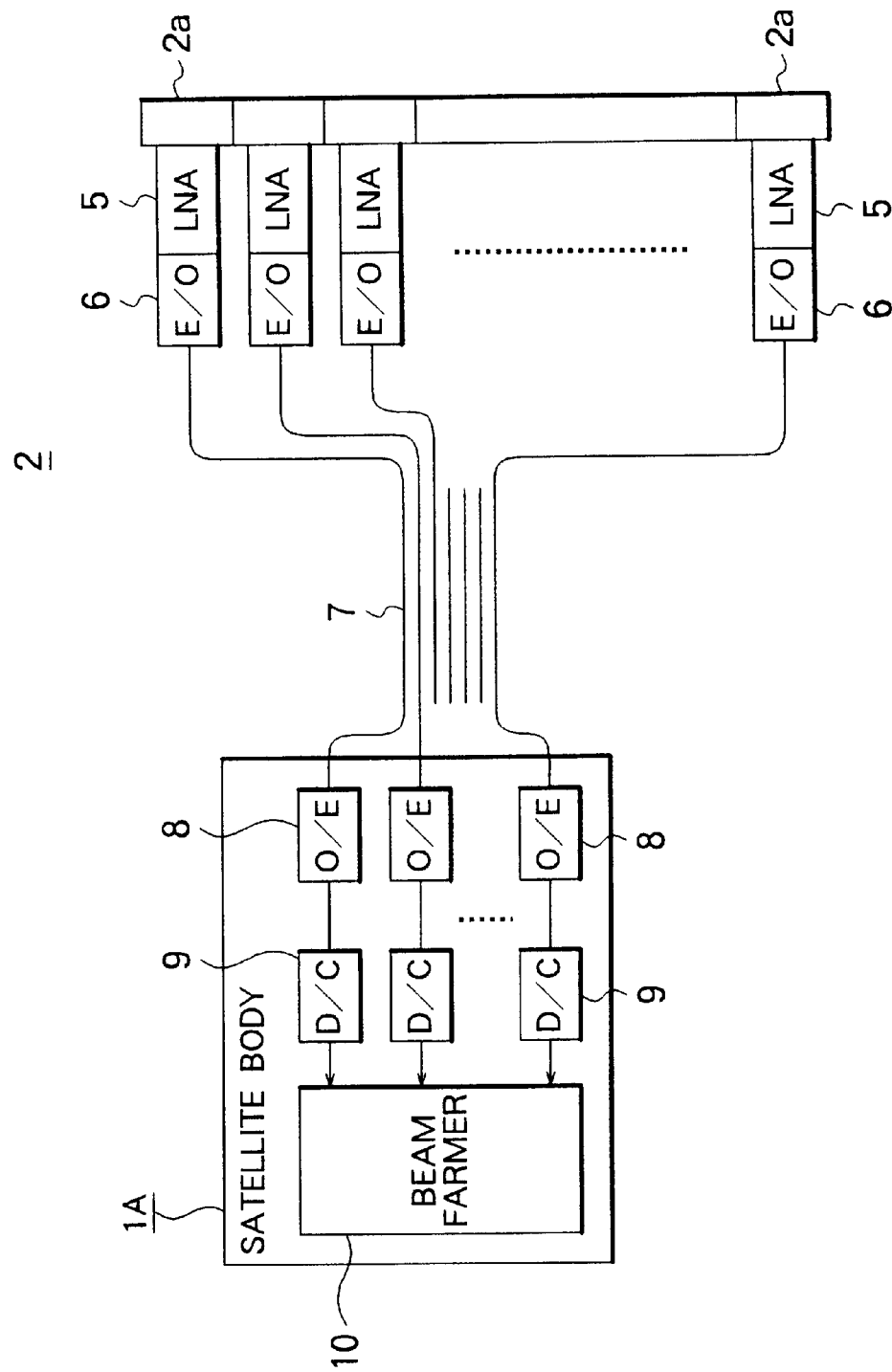
FIG. 4 is a diagram showing a structure of a mobile satellite communication system according to a third embodiment of the present invention.

A mobile satellite communication system according to a third embodiment of the present invention will be described with reference to FIG. 4. FIG. 4 is a diagram showing a structure of an artificial satellite in a static orbit or a semi-static orbit according to a third embodiment of the present invention.

In FIG. 4, reference numeral 1A denotes a satellite body, and 2 is a receive active phased array antenna.

Also, in the figure, reference symbol 2a denotes a receive device antenna or a sub-array made up of a plurality of device antennas; 5 is a low-noise amplifier (LNA); 6 is an electric wave-to-optical convertor (E/O); 7 is an optical fiber; 8 is an optical-to-electric wave convertor (O/E); 9 is a frequency convertor (D/C); and 10 is a beam former.

For example, there arises a problem that a loss in transmission increases usually in the case where a microwave having a frequency used for radio communication is employed when electricity is fed to an active phased array antenna 2 having an opening of 45 m square.

In the third embodiment, in the mobile satellite communication system as shown in FIG. 4, a signal received by each device antenna 2a of the active phased array antenna 2 is converted from a microwave signal into an optical signal. The optical signal as converted is led to the inside of the satellite body 1A using the optical fiber 7 and then converted into a microwave signal. The mobile satellite communication system has a function that performs the beam formation, and the active phased array antenna is developed in a static orbit or a semi-static orbit.

The operation will now be described. The signal received by each of the receive device antennas 2a is amplified to a required level by the low-noise amplifier 5. Sequentially, an electric signal is converted into an optical signal by the electric wave-to-optical convertor 6 to transmit the optical signal to the satellite body 1A through the optical fiber 7.

Then, the optical signal is converted into an electric signal through the optical-to-electric wave convertor 8, and further converted into a required frequency through the frequency convertor 9 to thus form an antenna beam (synthetic signal) through the beam former 10.

In the third embodiment, since the signal received by the receive active phased array antenna 2 is optically transmitted to the satellite body 1A through the optical fiber 7, a receive signal of the receive antenna positioned apart from the satellite body 1A can be transmitted at a low transmission loss.

Fourth Embodiment

Figure 5:
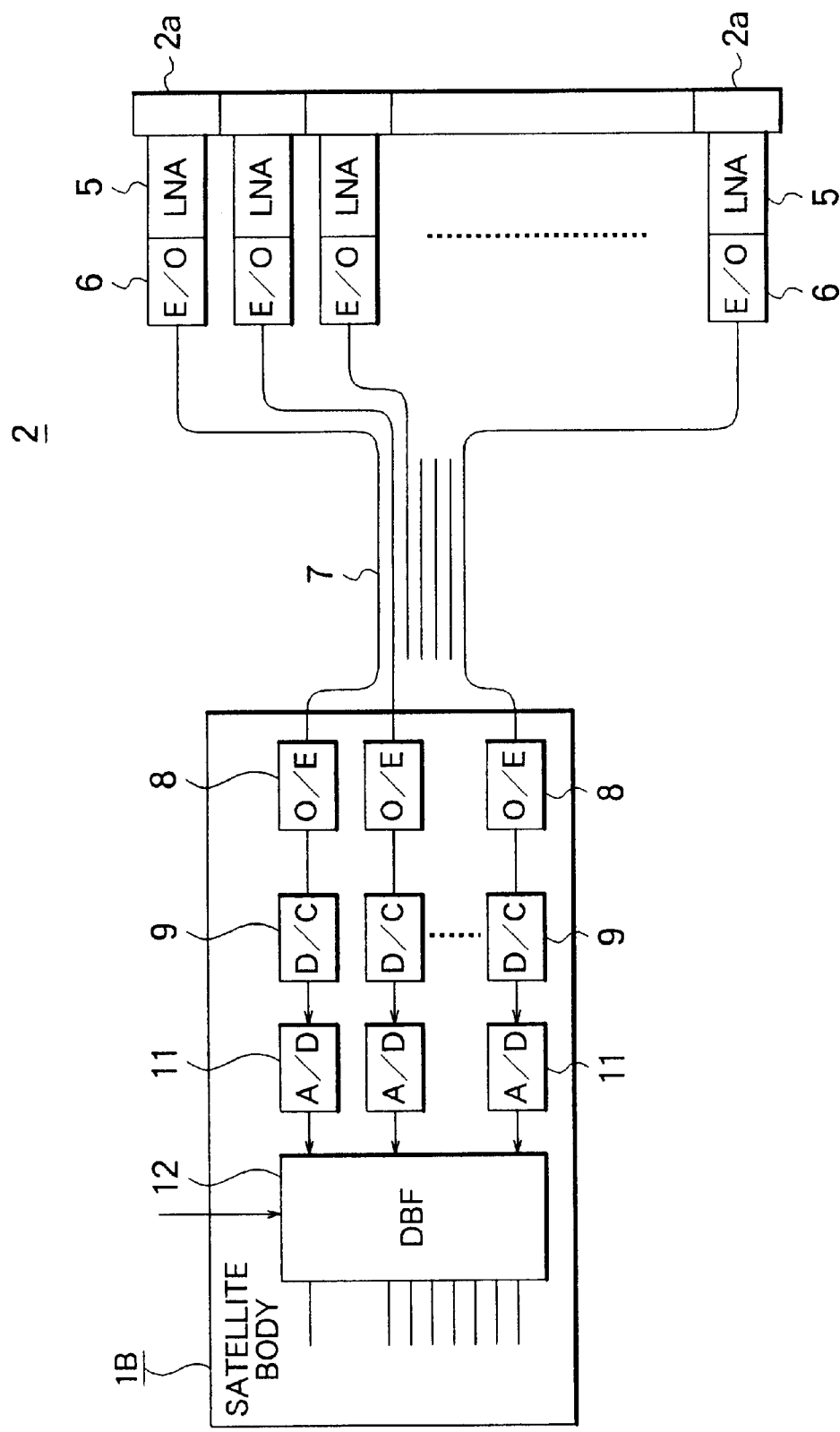
FIG. 5 is a diagram showing a structure of a mobile satellite communication system according to a fourth embodiment of the present invention.

A mobile satellite communication system according to a fourth embodiment of the present invention will be described with reference to FIG. 5. FIG. 5 is a diagram showing a structure of an artificial satellite in a static orbit or a semi-static orbit according to the fourth embodiment of the present invention.

In FIG. 5, reference symbol 1B denotes a satellite body, and 2 is a receive active phased array antenna.

Also, in the figure, reference symbol 2a denotes a receive device antenna or a sub-array made up of a plurality of device antennas; 5 is a low-nose amplifier (LNA); 6 is an electric wave-to-optical convertor (E/O); 7 is an optical fiber; 8 is an optical-to-electric wave convertor (O/E); 9 is a frequency convertor (D/C); 11 is an analog-to-digital convertor (A/D); and 12 is a digital beam former (DBF) made up of a digital signal processing unit.

In the case of forming a large number of beams at the same time, there arises such a problem that a transmission loss becomes large when beam formation is made in a microwave region. The fourth embodiment is made to reduce the above problem.

The operation will now be described. The signal received by each of the receive device antennas 2a is amplified to a required level by the low-noise amplifier 5. Sequentially, an electric signal is converted into an optical signal by the electric wave-to-optical convertor 6 to transmit the optical signal to the satellite body 1B through the optical fiber 7.

Then, the optical signal is converted into an electric signal through the optical-to-electric wave convertor 8, then converted into a required frequency through the frequency convertor 9, and further converted into a digital signal through the analog-to-digital signal convertor 11 to thus form a beam (synthetic signal) through the digital beam former 12.

There has arisen the problem that the transmission loss becomes larger in the beam former 10 using a battler matrix as the number of beams becomes large. However, if the beam formation is made by the digital signal processing unit 12 as in the fourth embodiment, the transmission loss is kept constant even if the number of beams is increased.

The fourth embodiment is designed to form a plurality of antenna beams from the digital signal obtained by subjecting the microwave signal to A/D conversion using the digital signal processing unit 12, thereby being capable of forming a large number of antenna beams at a low transmission loss.

Fifth Embodiment

Figure 6:
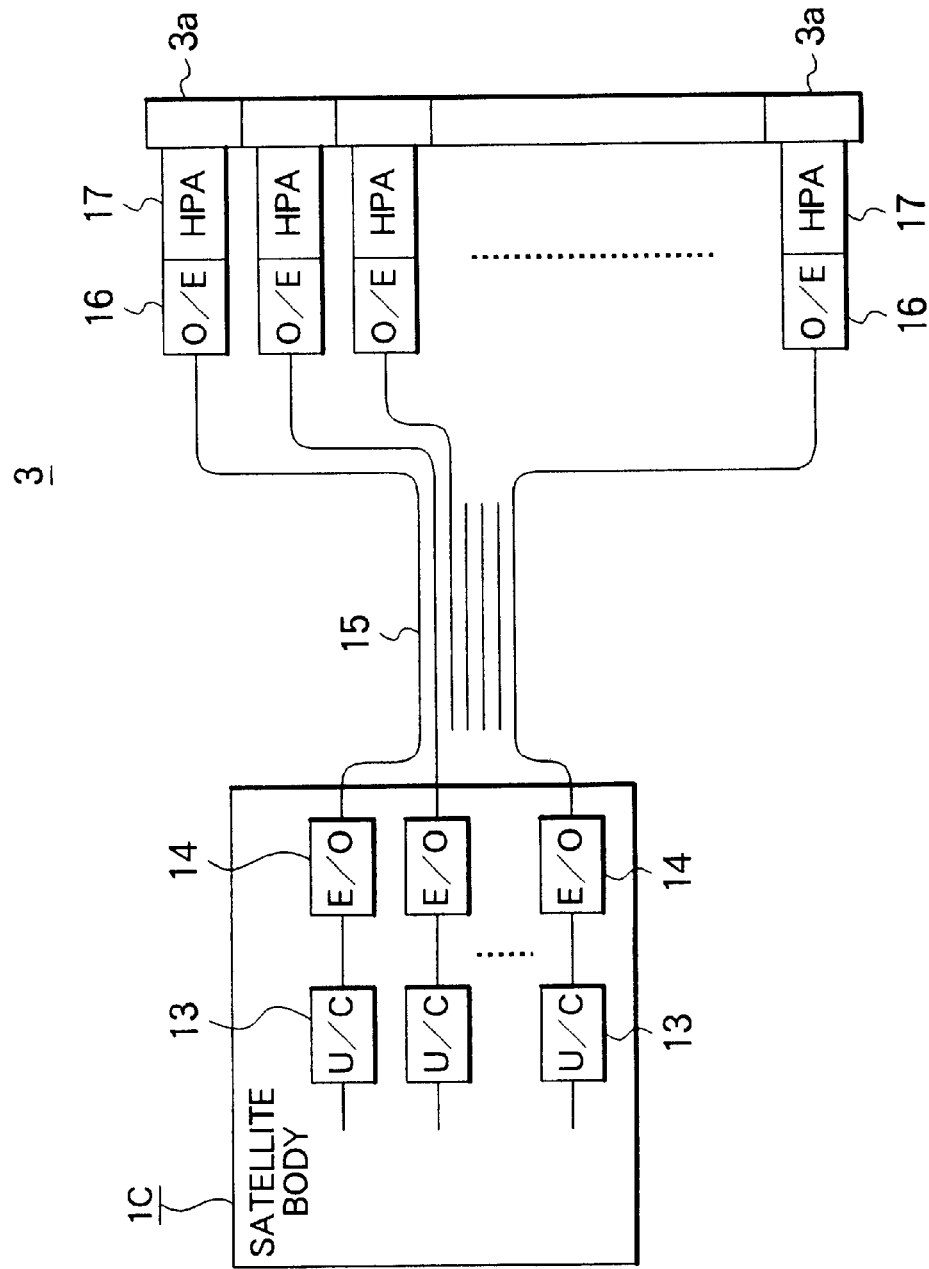
FIG. 6 is a diagram showing a structure of a mobile satellite communication system according to a fifth embodiment of the present invention.

A mobile satellite communication system according to a fifth embodiment of the present invention will be described with reference to FIG. 6. FIG. 6 is a diagram showing a structure of an artificial satellite in a static orbit or a semi-static orbit according to the fifth embodiment of the present invention.

In FIG. 6, reference symbol 1C denotes a satellite body, and 3 is a transmit active phased array antenna.

Also, in the figure, reference numeral 13 denotes a frequency convertor (U/C); 14 is an electric wave-to-optical convertor (E/O); 15 is an optical fiber; 16 is an optical-to-electric wave convertor (O/E); 17 is a high-output amplifier (HPA); and 3a is a transmit device antenna or a sub-array made up of a plurality of device antennas.

For example, there arises a problem that a loss in transmission increases usually in the case where a microwave having a frequency used for radio communication is employed when electricity is fed to an active phased array antenna 3 having an opening of 45 m square.

The operation of the fifth embodiment will be described below. As shown in FIG. 6, what is obtained by multiplying a data signal by a driving amplitude phase of a signal given to each of the device antennas 3a for beam formation is converted into an appropriated frequency through the frequency convertor 13, then converted into an optical signal through the electric wave-to-optical convertor 14, and transmitted up to the transmit active phased array antenna 3 outside of the satellite using the optical fiber 15.

Then, the optical signal as transmitted is converted into a microwave signal through the optical-to-electric wave convertor 16, amplified by the high-output amplifier 17, and radiated from the transmit device antenna 3a.

The fifth embodiment is designed to convert the optical signal optically transmitted from the satellite body 1C into the microwave signal to radiate the microwave signal from a transmit antenna, thereby being capable of transmitting a signal from the satellite body 1C to the transmit antenna at a low transmission loss.

Sixth Embodiment

Figure 7:
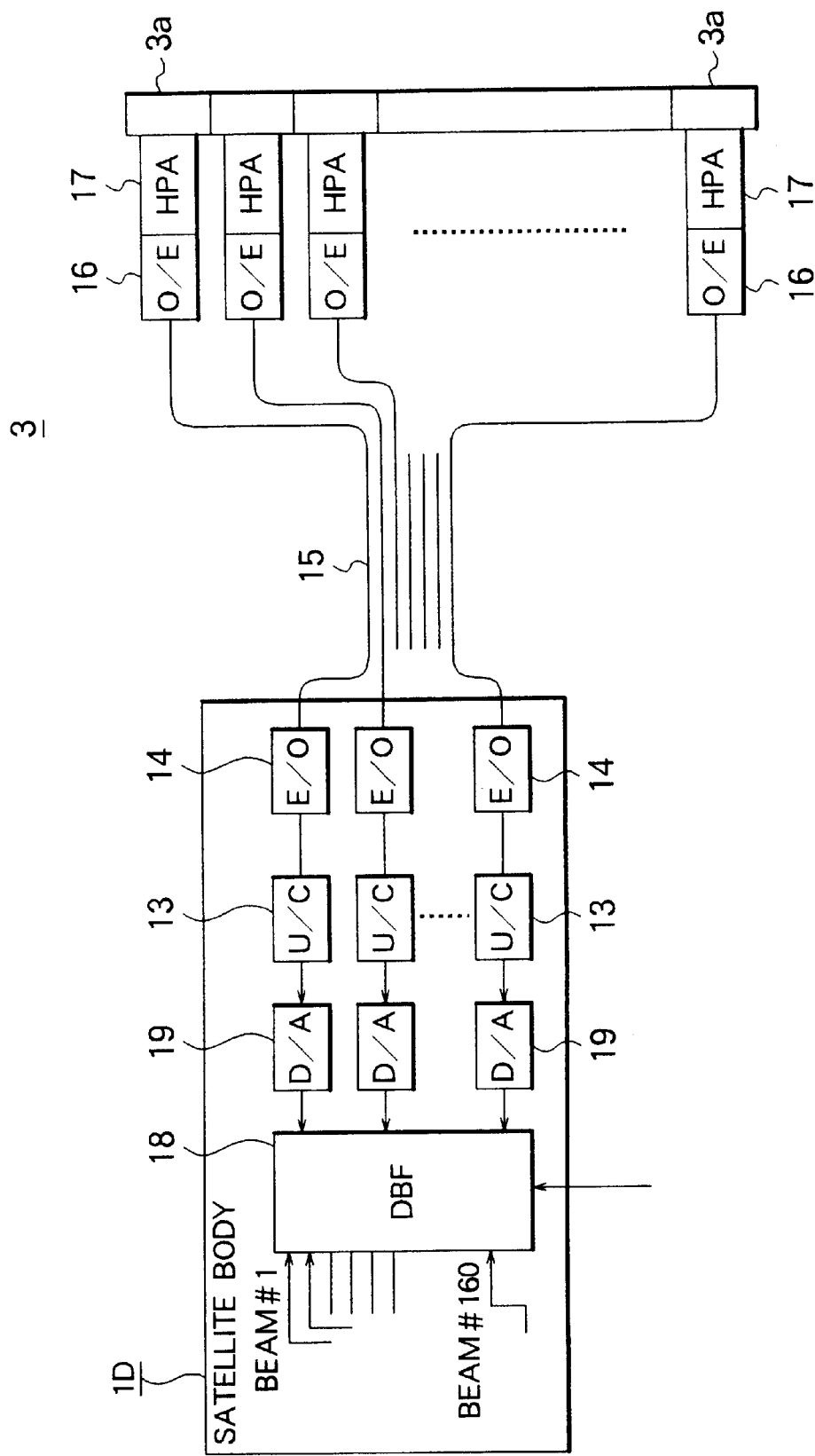
FIG. 7 is a diagram showing a structure of a mobile satellite communication system according to a sixth embodiment of the present invention.

A mobile satellite communication system according to a sixth embodiment of the present invention will be described with reference to FIG. 7. FIG. 7 is a diagram showing a structure of an artificial satellite in a static orbit or a semi-static orbit according to the sixth embodiment of the present invention.

In FIG. 7, reference symbol 1D denotes a satellite body, and 3 is a transmit active phased array antenna.

Also, in the figure, reference numeral 18 denotes a digital beam former (DBF) made up of a digital signal processing unit; 19 is a digital-to-analog signal convertor (D/A); 13 is a frequency convertor (U/C); 14 is an electric wave-to-optical convertor (E/O); 15 is an optical fiber; 16 is an optical-to-electric wave convertor (O/E); 17 is a high-output amplifier (HPA); and 3a is a transmit device antenna or a sub-array made up of a plurality of device antennas.

In the case of forming a large number of beams by multiplying the data signal by a weight that forms a beam, there arises a problem that a loss in transmission increases usually in the case where a microwave having a frequency used for radio communication is employed at the time of feeding operation.

The operation of the sixth embodiment will be described below. As shown in FIG. 7, a process of multiplying a data signal by a driving amplitude phase of a signal given to each of the device antennas 3a for beam formation through the digital signal processing unit 18, and its result is converted into an analog signal through the digital-to-analog signal convertor 19. The converted signal is further converted into an appropriate frequency through the frequency convertor 13, then converted into an optical signal through the electric wave-to-optical convertor 14, and transmitted up to the transmit active phased array antenna 3 outside of the satellite using the optical fiber 15.

Subsequently, the optical signal as transmitted is converted into a microwave signal through the optical-to-electric wave convertor 16, amplified by the high-output amplifier 17, and then radiated from the transmit device antenna 3a.

The sixth embodiment is designed to arithmetically operate the driving amplitude phase of a signal given to each of the device antennas 3a for beam formation through the digital signal processing unit 18 and convert it into an analog signal through the digital-to-analog signal convertor 19. The processing onward is identical with that in the above fifth embodiment.

According to the sixth embodiment, because the transmit data is formed by the digital signal processing unit 18, accurate data is given to the amplitude phase so that beam pointing can be performed with a high accuracy.

Seventh Embodiment

Figure 8:
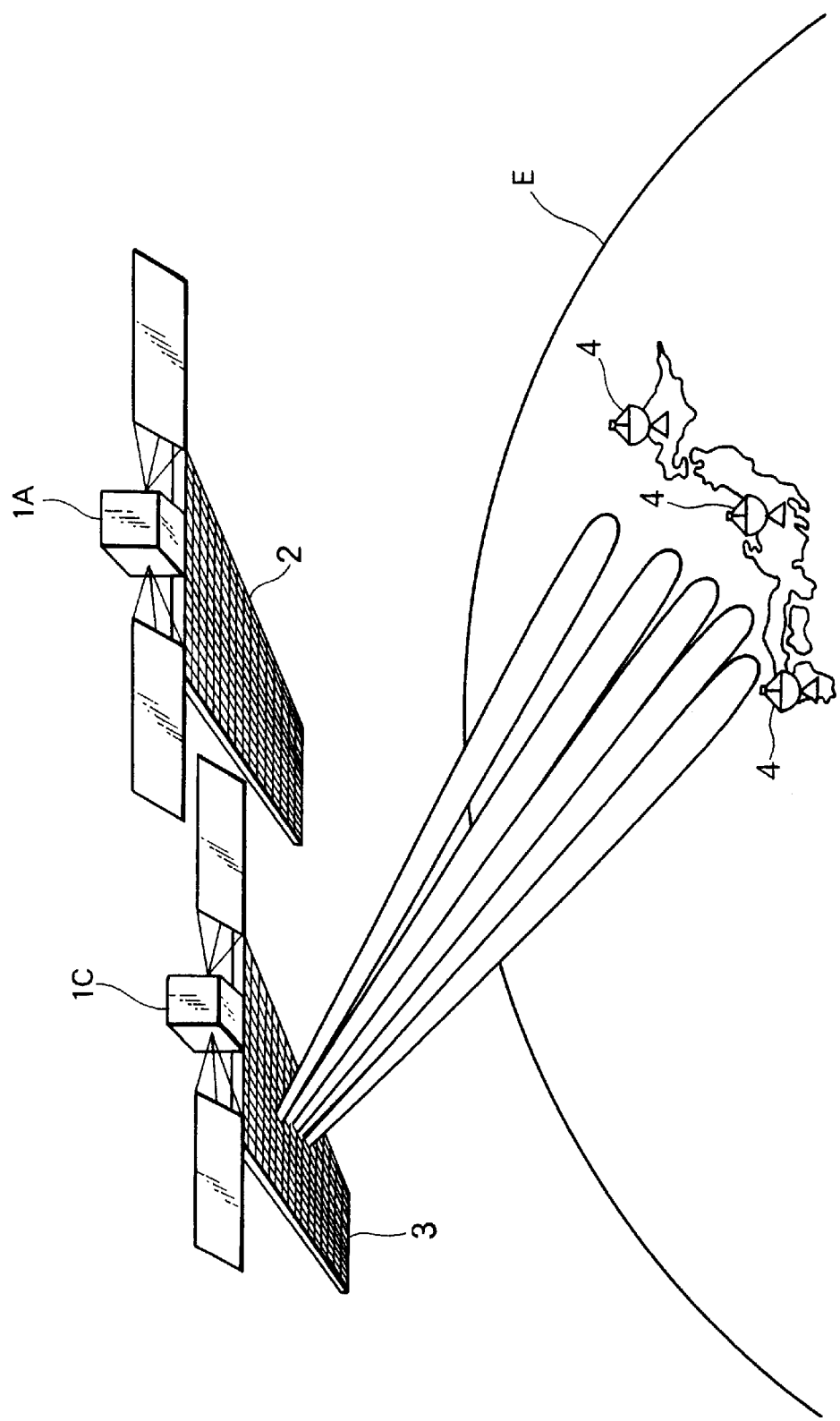
FIG. 8 is a diagram showing a structure of a mobile satellite communication system according to a seventh embodiment of the present invention.

A mobile satellite communication system according to a seventh embodiment of the present invention will be described with reference to FIG. 8. FIG. 8 is a diagram showing a structure of an artificial satellite in a static orbit or a semi-static orbit according to the seventh embodiment of the present invention.

In FIG. 8, reference symbol 1A denotes a satellite body of a receive artificial satellite for only reception, and 2 is a receive active phased array antenna. Also, reference symbol 1C denotes a satellite body of a transmit artificial satellite for only transmission, and 3 is a transmit active phased array antenna. In addition, reference symbol E is the earth, and 4 is a terrestrial station.

For example, in the case where two antennas having an opening of 45 m square for transmission and reception are folded and accommodated in a rocket, it is difficult to realize the weight and thickness of those two antennas.

Under the above circumstance, in the seventh embodiment, as shown in FIG. 8, an artificial satellite in which only the receive active phased array antenna 2 is accommodated and an artificial satellite in which only the transmit active phased array antenna 3 is accommodated are shot up in a pair, and used to conduct communication therebetween.

FIG. 8 shows a case in which the satellite body 1A of the above third embodiment as the receive artificial satellite for only reception and the satellite body 1C of the above fifth embodiment as the transmit artificial satellite for only transmission are used, respectively. Alternatively, the satellite body 1B of the above fourth embodiment as the receive artificial satellite for only reception and the satellite body 1D of the above sixth embodiment as the transmit artificial satellite for only transmission may be used, respectively.

In the seventh embodiment, the artificial satellite on which only the receive antenna is mounted and the artificial satellite on which only the transmit antenna is mounted are used in a pair to communicate between the respective satellites by a radio or wire signal, whereby the antenna is easily accommodated in the rocket.

Eighth Embodiment

Figure 9:
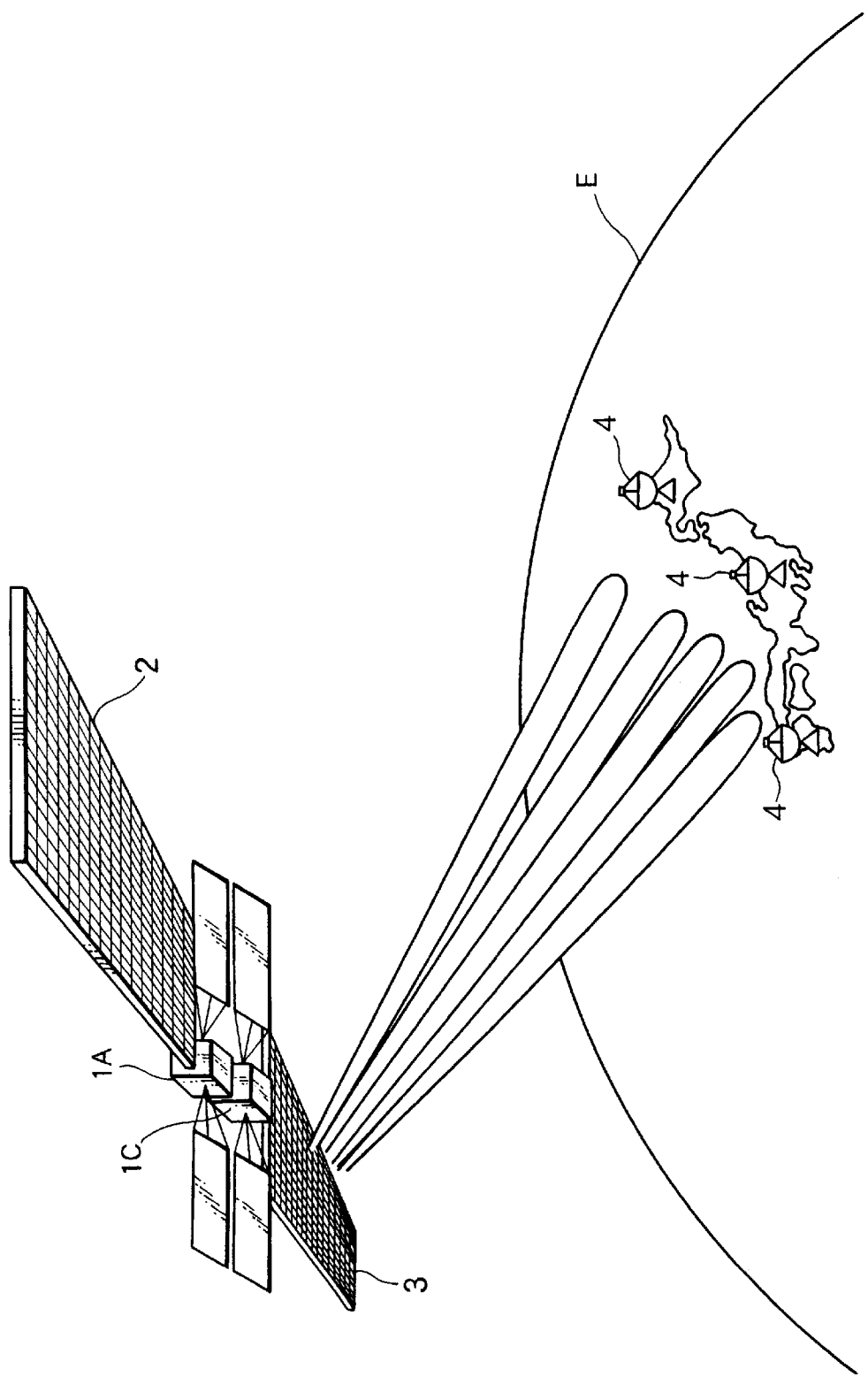
FIG. 9 is a diagram showing a structure of a mobile satellite communication system according to an eighth embodiment of the present invention.
Figure 10:
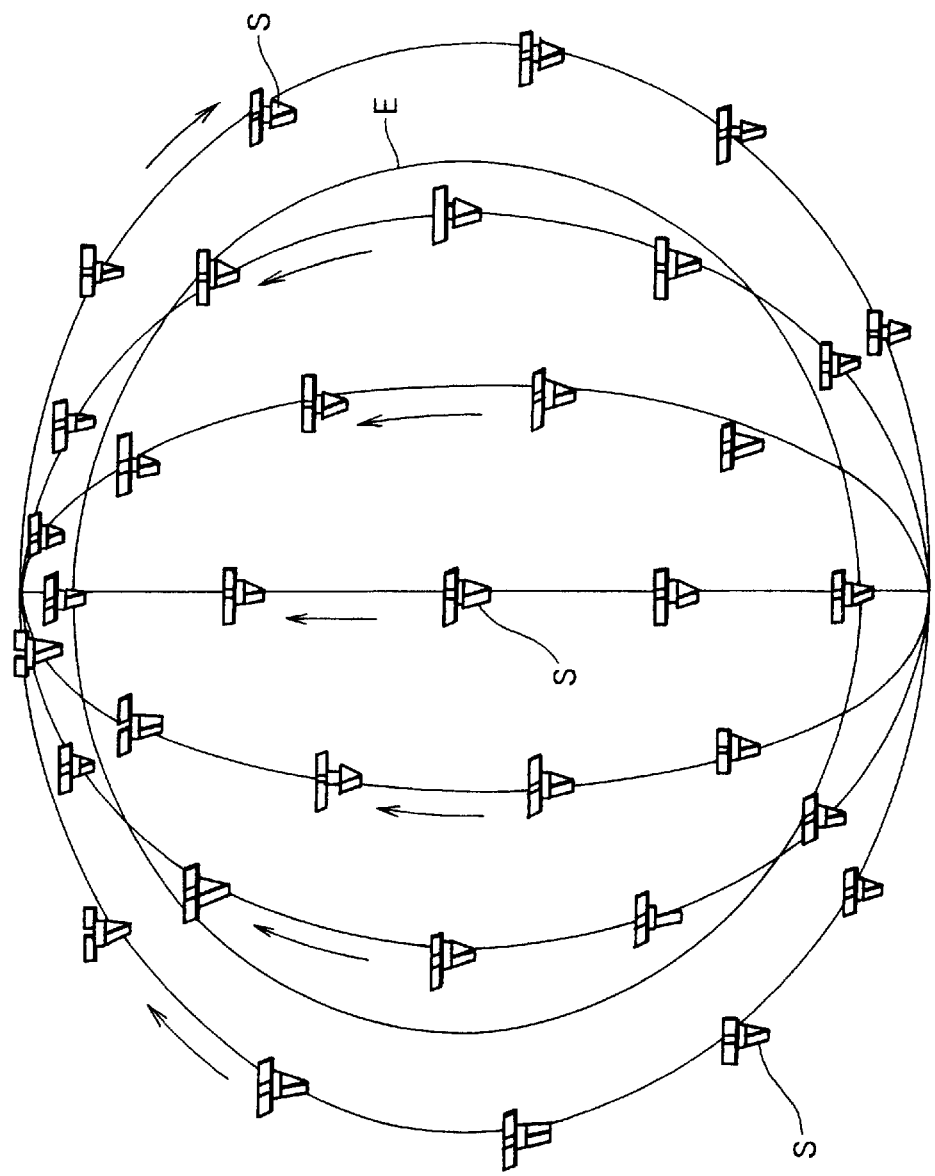
FIG. 10 is a diagram showing a structure of a conventional mobile satellite communication system.

A mobile satellite communication system according to an eighth embodiment of the present invention will be described with reference to FIG. 9. FIG. 9 is a diagram showing a structure of an artificial satellite in a static orbit or a semi-static orbit according to the eighth embodiment of the present invention.

In FIG. 9, reference symbol 1A denotes a satellite body of a receive artificial satellite for only reception, and 2 is a receive active phased array antenna. Also, reference symbol 1C denotes a satellite body of a transmit artificial satellite for only transmission, and 3 is a transmit active phased array antenna. In addition, reference symbol E is the earth, and 4 is a terrestrial station.

For example, in the case where two antennas having an opening of 45 m square for transmission and reception are folded and accommodated in a rocket, it is difficult to realize the weight and thickness of those two antennas.

Under the above circumstance, in the eighth embodiment, as shown in FIG. 9, an artificial satellite in which only the receive active phased array antenna 2 is accommodated and an artificial satellite in which only the transmit active phased array antenna 3 is accommodated are shot up in a pair, and thereafter docked together to provide a transmit/receive function.

FIG. 9 shows a case in which the satellite body 1A of the above third embodiment as the receive artificial satellite for only reception and the satellite body 1C of the above fifth embodiment as the transmit artificial satellite for only transmission are used, respectively. Alternatively, the satellite body 1B of the above fourth embodiment as the receive artificial satellite for only reception and the satellite body 1D of the above sixth embodiment as the transmit artificial satellite for only transmission may be used, respectively.

In the eighth embodiment, the artificial satellite on which only the receive antenna is mounted and the artificial satellite on which only the transmit antenna is mounted are used in a pair, and then docked together after both the satellites are put in orbit, whereby the antenna is easily accommodated in the rocket.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A mobile satellite communication system comprising an artificial satellite, disposed in a satellite orbit, which develops an active phased array antenna so that it accomplishes a line to a terrestrial station using a portable terminal in a specific area, wherein said satellite orbit is a substantially static orbit inclined with respect to the equator and having an eccentricity;

wherein said active phased array antenna includes a receive active phased array antenna and a transmit active phased array antenna;

wherein said artificial satellite includes a receive artificial satellite for reception only on which said receive active phased array antenna is mounted and a transmit artificial satellite for transmission only on which said transmit active phased array antenna is mounted;

wherein said receive artificial satellite and said transmit artificial satellite are docked with each other after said receive artificial satellite and said transmit artificial satellite are put in said substantially static orbit, to exhibit a transmit/receive function as one artificial satellite;

wherein said receive active phased array antenna includes a first electric wave-to-optical convertor that converts a signal received by a receive device antenna into an optical signal;

wherein a receive satellite body of said receive artificial satellite includes a first optical-to-electric wave convertor that converts the optical signal into an electric signal;

wherein said first electric wave-to-optical convertor and said first optical-to-electric wave convertor are connected through a first optical fiber;

wherein a transmit satellite body of said transmit artificial satellite includes a second electric wave-to-optical convertor that converts the electric signal into the optical signal;

wherein said transmit active phased array antenna includes a second optical-to-electric wave convertor that converts the optical signal into a microwave signal and a transmit device antenna that radiates said microwave signal; and wherein said second electric wave-to-optical convertor and said second optical-to-electric wave convertor are connected through a second optical fiber.

2. A mobile satellite communication system comprising an artificial satellite that is disposed in a satellite orbit and develops an active phased array antenna so that it accomplishes a line to a terrestrial station using a portable terminal in a specific area, wherein said satellite orbit is a substantially static orbit inclined with respect to the equator and having an eccentricity;

wherein said active phased array antenna includes a receive active phased array antenna and a transmit active phased array antenna;

wherein said receive active phased array antenna includes a first electric wave-to-optical convertor that converts a signal received by a receive device antenna into an optical signal;

wherein a satellite body of said artificial satellite includes a first optical-to-electric wave convertor that converts the optical signal into an electric signal;

wherein said first electric wave-to-optical convertor and said first optical-to-electric wave convertor are connected through a first optical fiber;

wherein said satellite body further includes a second electric wave-to-optical convertor that converts the electric signal into the optical signal;

wherein said transmit active phased array antenna includes a second optical-to-electric wave convertor that converts the optical signal into a microwave signal and a transmit device antenna that radiates said microwave signal; and wherein said second electric wave-to-optical convertor and said second optical-to-electric wave convertor are connected through a second optical fiber.

3. The mobile satellite communication system according to claim 2, wherein said satellite body further includes an analog-to-digital signal convertor that converts said analog electric signal into a digital signal, a first digital beam former that forms a beam on the basis of said digital signal, a second digital beam former that forms a beam on the basis of a data signal, and a digital-to-analog signal convertor that converts said digital electric signal into an analog signal.

* * * * *

UNITED STATES PATENT AND TRADEMARK OFFICE
CERTIFICATE OF CORRECTION

PATENT NO. : 6,043,776
DATED : March 28, 2000
INVENTOR(S): Isamu Chiba, Takashi Katagi, Shuji Urasaka, Yoshihiko Konishi, Makoto Matsunaga and Akio Iso It is certified that error appears in the above-identified patent and that said Letters Patent is hereby corrected as shown below:

Fig. 4, reference numeral 10, change "BEAM FARMER" to --BEAM FORMER--; and Column 6, line 7, change "a battler matrix" to --a Butler matrix--.

Signed and Sealed this

Fifteenth Day of May, 2001

*Attest:*

NICHOLAS P. GODICI

*Attesting Officer*   *Acting Director of the United States Patent and Trademark Office*